United States Patent
Barnes et al.

(10) Patent No.: US 12,532,020 B2
(45) Date of Patent: Jan. 20, 2026

(54) SYSTEM AND METHOD FOR ENCODING AND DECODING SPATIAL TILES OF A STILL IMAGE BASED ON APPLIED QUALITY LEVELS

(71) Applicant: Apple Inc., Cupertino, CA (US)

(72) Inventors: Leo Barnes, Haiar (SE); Alexandros Tourapis, Los Gatos, CA (US)

(73) Assignee: APPLE INC., Cupertino, CA (US)

( * ) Notice: Subject to any disclaimer, the term of this patent is extended or adjusted under 35 U.S.C. 154(b) by 500 days.

(21) Appl. No.: 18/059,013

(22) Filed: Nov. 28, 2022

(65) Prior Publication Data

US 2024/0179336 A1 May 30, 2024

(51) Int. Cl.
*H04N 19/30* (2014.01)
*H04N 19/167* (2014.01)
*H04N 19/51* (2014.01)

(52) U.S. Cl.
CPC ........... *H04N 19/51* (2014.11); *H04N 19/167* (2014.11); *H04N 19/30* (2014.11)

(58) Field of Classification Search
CPC ........ H04N 19/30; H04N 19/51; H04N 19/50; G06T 9/00; G06T 2207/20172; G06T 2210/36; G06V 10/20
See application file for complete search history.

(56) References Cited

U.S. PATENT DOCUMENTS

| | | | | |
|---|---|---|---|---|
| 9,351,007 B1* | 5/2016 | Hobbs | | H04N 19/102 |
| 10,003,803 B1* | 6/2018 | Ostiguy | | H04N 19/172 |
| 2004/0170332 A1* | 9/2004 | Andrew | | H04N 19/36 |
| | | | | 382/233 |
| 2011/0090960 A1* | 4/2011 | Leontaris | | H04N 19/194 |
| | | | | 375/240.18 |
| 2014/0254668 A1* | 9/2014 | Rapaka | | H04N 19/50 |
| | | | | 375/240.12 |
| 2016/0212433 A1* | 7/2016 | Zhu | | H04N 19/182 |
| 2016/0360231 A1* | 12/2016 | Yuan | | H04N 19/503 |
| 2018/0020220 A1* | 1/2018 | Leontaris | | H04N 19/124 |
| 2018/0077426 A1* | 3/2018 | Zhang | | H04N 19/157 |
| 2018/0091764 A1* | 3/2018 | Aharon | | H04N 7/0102 |
| 2018/0249192 A1* | 8/2018 | Denoual | | H04N 21/440245 |
| 2018/0376152 A1* | 12/2018 | Wang | | H04N 21/4223 |
| 2019/0037256 A1* | 1/2019 | Denoual | | H04N 21/8456 |
| 2019/0132601 A1* | 5/2019 | Nakagami | | H04N 19/70 |
| 2020/0267388 A1* | 8/2020 | Lainema | | H04N 19/176 |

(Continued)

OTHER PUBLICATIONS

International Patent Application No. PCT/US2023/076221; Int'l Search Report and the Written Opinion; dated Jan. 5, 2024; 18 pages.

(Continued)

*Primary Examiner* — Guillermo M Rivera-Martinez
(74) *Attorney, Agent, or Firm* — BAKERHOSTETLER (57) ABSTRACT

Improved still image encoding techniques may include generating first items of a log and second items of coded tile-layer image data, where the log enumerates coding quality levels contained in the second items. The second items may include independent-type items, derived-type items of identity variant, and derived-type items with other variant(s). Such encoding techniques may provide for progressive decoding of images, and may provide for spatially variable encoding quality levels.

20 Claims, 6 Drawing Sheets

(56) References Cited

U.S. PATENT DOCUMENTS

2021/0329285 A1* 10/2021 Yonezawa .............. H04N 19/23
2022/0191509 A1*  6/2022 Meardi ................. H04N 19/14

OTHER PUBLICATIONS

"Information technology—High efficiency coding and media delivery in heterogeneous environments—part 12: Image File Format—Amendment: Support for progressive rendering signalling and other improvements"; ISO/IEC 23008-12:22/AMD 1:2022; ® 2022; 35 pages.
"Information technology—MPEG system technologies—part 12: Image File Format"; ISO/IEC FIDS 23008-12 $1^{st}$ Edition; Jun. 2015; 68 pages.
Sullivan et al.; "Text of ISO/IEC FDIS 23000-22 Multi-Image Application Format (MIAF)"; ISO/IEC JTC1/SC29/WG11; Oct. 2019; 43 pages.
International Patent Application No. PCT/US2023/076221; Int'l Preliminary Report on Patentability; dated Feb. 17, 2025; 20 pages.

* cited by examiner

SYSTEM AND METHOD FOR ENCODING AND DECODING SPATIAL TILES OF A STILL IMAGE BASED ON APPLIED QUALITY LEVELS

TECHNICAL FIELD

This disclosure relates to data compression, and, particularly, to compression of digital images.

BACKGROUND

Compression of digital still images generally includes conversion of single rectangular array of pixels into a compressed with an entropy coder into a stream of binary bits, often called a bitstream. Decompression of the bitstream typically requires parsing the entire, or almost the entire, bitstream before a reconstructed image can be created.

DETAILED DESCRIPTION

Aspects of the present disclosure provide a flexible encoded format for images that can be parsed into separate bitstream units, where the units may include an encoding of a spatial partition of the image at a particular image quality. In aspects, such an encoded format may provide for progressive decoding, spatially selective transmission and decoding, and spatially variable encoding quality level. Progressive decoding may allow a first portion of a bitstream of an encoded image to be decoded as a preliminary reconstructed version of the image at a preliminary quality, for example, prior to receiving a second portion, and then later decoding the second portion to reconstruct a higher quality version. Spatial selectivity may allow for transmission and/or decoding of a spatial portion of the image without transmission and/or decoding of other portions of the image. Encoding at spatially variable quality levels may allow different spatial regions of an image to be encoded at different quality levels. A combination of one or more of these features may provide improved still image coding techniques.

Moreover, aspects of the disclosure include generating a log of coding quality levels applied to the still image, the log including a plurality of first items corresponding to each quality level that contains references to second items corresponding to the respective quality level. For each of a plurality of spatial tiles of the still image, generating a second item at each quality level identified in the log, wherein each second item is one of a plurality of item types, including encoding tiles. When a second item has an independent type, encoding a tile at the respective quality without reference to others of the generated second items. When a second item has a derived type with an increased quality level, encoding a tile with refinement data at the second item's respective quality level at least in part by reference to another of the generated second items corresponding to its respective tile. When a second item has the derived type without an increased quality level, encoding a tile, at least in part by reference to another of the generated second items corresponding to the same tile, and without refinement data at a second, lower coding quality level of a reference tile of the second item.

Further, aspects of the disclosure include parsing, from an encoded stream, a log of coding quality levels applied to the still image, the log including a plurality of log items corresponding to each quality level that contains references to second items corresponding to the respective quality level. For a plurality of spatial tiles of the still image, parsing, from the encoded stream, a second item at each quality level identified in the log, wherein each second item is one of a plurality of item types. In response to determining that a parsed second item has an independent type, decoding the parsed second item at the respective quality without reference to others of the parsed second items to produce a reconstrued tile at the respective quality level. In response to determining that a second item has a derived type and includes refinement data, decoding the second item at least in part by reference to another of the parsed second items to produce a reconstrued tile at the parsed second item's respective quality level. In response to determining that a parsed second item has a derived type and does not include refinement data, decoding the parsed second item at least in part by reference to another of the parsed second items to produce a reconstrued tile at the referenced second item's respective quality level.

In some coding aspects, both the first items in the log and the second items for encoded layers of tiles may be transmitted or received in a communications channel. Derived-type second items may indicate prediction of the corresponding tile from the corresponding referenced second item with a motion-compensation video coding tool, and/or derived-type second items may indicate selection of a layer corresponding one of a plurality of coding quality levels from a multi-layer video coding tool. Second items may be grouped into tile sets, and an ordering of the tiles in a tile set may start with a tile corresponding to a region of interest and then follow with tiles following a spiral path away from the region of interest.

Figure 1:
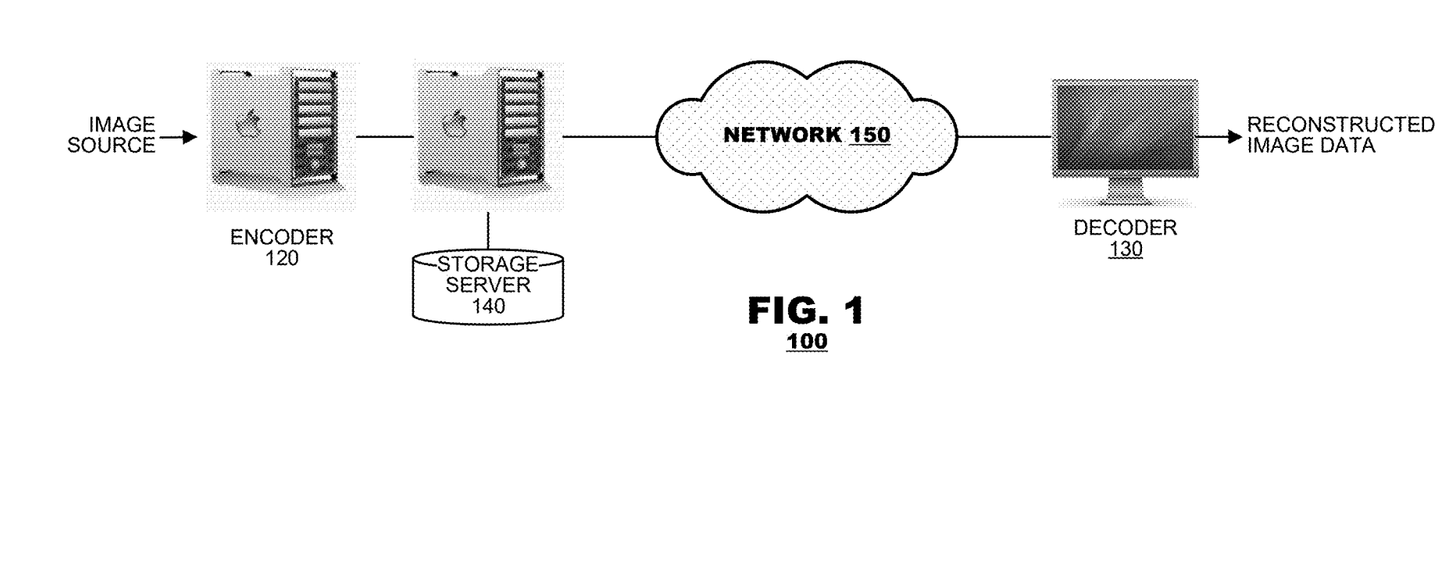
FIG. 1 is a block diagram of a coding system according to aspects of this disclosure.

FIG. 1 is a block diagram of a coding system 100 according to an aspect of this disclosure. In the system 100, an image source of one or more images may be encoded by an encoder 120 to produce an encoded bitstream. The encoded bitstream may be stored in a computer readable medium such as storage server 140 or otherwise transmitted to a decoder 130. Decoder 130 may decode the encoded bitstream to produce one or more reconstructed images. In an aspect, decoder 130 may request an encoded bitstream or portions thereof from storage server 140.

In operation, the encoder 120 may spatially partition an image from the image source into regions referred to herein as "tiles," and the encoder 120 may encode each tile at one or more quality levels and output discrete packaging units containing the tiles encoded at various quality levels.

In operation, the decoder 130 may substantially invert some operations of the encoder 120. The decoder 130 may parse the discrete packaging units in the encoded bitstream to extract coded data for individual tiles coded at a particular quality level. In an aspect, only a subset of the encoded tiles in the encoded bitstream are decoded, for example if only certain tiles are desired, or if only a certain quality level is desired.

In an aspect, the decoder 130 may progressively output reconstructed image data. For example, a first tile encoded at a lower quality level of a tile may be reconstructed prior to decoder 130 receiving a portion of the encoded bitstream including a second encoding of the tile at a higher quality level. Then, after receiving and decoding the second encoding of the tile, the higher quality reconstruction of the tile may be output from the decoder 130.

In an aspect, encoder and decoder 120, 130 may operate in part according to an image or video coding protocol such as HEVC (ITU-T H.265), and encoded tile data may include one or more HEVC syntax layers such as coding tree unit (CTU), coding tree block (CTB), coding unit (CU), prediction unit (PU), or transform unity (TU). In some aspects encoder 120 and decoder 130 may operate according to a coding protocol that requires every spatial tile to be encoded at every quality level.

Figure 2A:
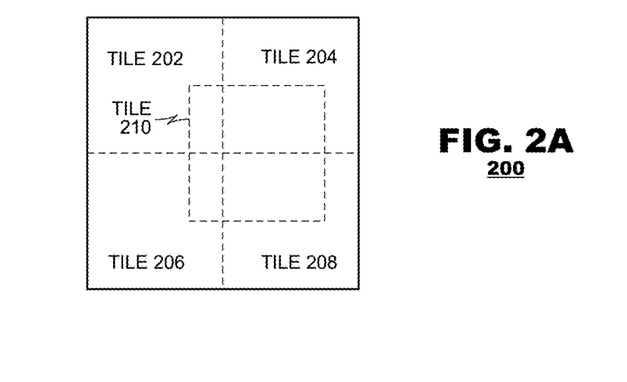
FIG. 2A depicts an example partitioning of a frame into tiles.

FIG. 2A depicts an example partitioning of an image 200 into tiles. Image 200 is shown as partitioned into four tiles 202, 204, 206 and 208 that together cover the entire spatial area of image 200. In the example illustrated in FIG. 2A, the frame 200 is shown as partitioned into overlapping tiles where the entire frame is partitioned into four nonoverlapping tiles 202, 204, 206, and 208, while tile 210 spatially overlaps a portion of the area occupied by each of the tiles 202, 204, 206, and 208. The content of the tiles 202-210 therefore, contain redundant image content. In an aspect, an overlapped tile such as tile 210 may correspond to a region of interest and may be encoded to a different quality level as compared to the other tiles it overlaps with. The principles of the present disclosure, however, find application with other tile partitioning configurations, such as where tiles do not overlap each other. In an aspect, tiles may correspond to identical-sized rectangular or square portions of a source image, but in other aspects, this disclosure is not so limited.

Figure 2B:
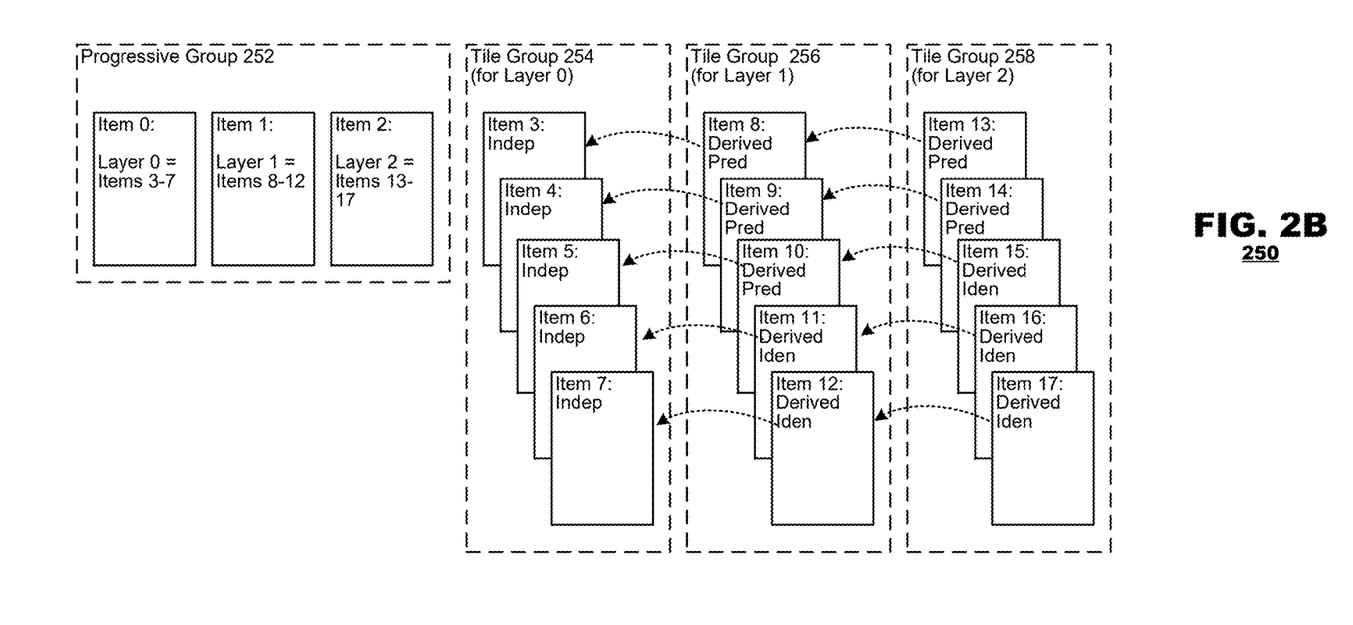
FIG. 2B depicts example bitstream packaging units for the tiles of FIG. 2A.

FIG. 2B depicts bitstream packaging 250 for the tiles illustrated in FIG. 2A. In this example, 18 packaging units (also referred to as "items" herein) are created from the tiles 202-210, which are organized into a progressive group 252 and a plurality of tile groups 256-258. A collection of tiles, each encoded at some quality level, is referred to herein as a coded "layer," and an encoding of a tile at a quality level is referred to herein as a coded "tile-layer." A progressive group may include first packing units that identify the quality layers available in the bitstream and may provide references to second packing units containing encoded tiles at the various quality layers. Each tile group, such as group 254, may include the second packing units, each second packing unit providing an encoding of a tile-layer for one spatial tile at one quality level. In the example of FIG. 2B, there are three log items 0 to 2 in the progressive group 252, each log item corresponding to one of the tile groups 254, 256 and 258. There are five items 3-7, 8-12, and 13-17 in each of the tile groups 254, 256, 258, respectively. Each of the five items in each tile group may correspond to one of the tiles 202-210 in the example of FIG. 2A.

Tile groups 254-258 are provided for each coding quality level supported by the system 100 (FIG. 1). Thus, in the example of FIG. 3, the three tile groups 254-258 correspond to three coding quality levels supported by the system 100. An item (say item 10) within a given tile group contains information regarding its respective tile 206 (FIG. 2A) that, when decoded with respect to other item(s) on which the item 10 depends, provides a decoded representation of the tile 206 at the coding quality associated with its tile group 256.

More generally, a tile group (say tile group 254) of packaging units may provide the tile-layer units corresponding to a respective coding quality layer. In the example of FIG. 2B, a first layer of encoding quality may be provided by tile group 254, which includes tile-layer items 3-7, where each tile-layer item 3-7 includes coded data of a corresponding tile 202-210 (FIG. 2A) at a first layer (say, layer 0), where layer 0 corresponds to tiles coded at a respective quality level 0. A second layer of encoded quality may be provided by tile group 256 including items 8-12 coded at quality level 1, and a third layer of encoded quality may be provided by tile group 258 including items 13-17 coded at quality level 2.

A progressive group 252 of packaging units may provide organizational data (colloquially, a "log") of the tile-layer items and a grouping into layers. The log may identify the different coding quality layers available for an image, and may further provide reference or pointers to the locations of each encoded tile within each identified coding quality layer. In the example of FIG. 2B, progressive group 252 is shown as including log items 0-2 that provide a log of the tile-layer packaging units included in each of the encoding layers 0 to 2. Item 0 may indicate that layer 0 includes tile-layer item 3-7; item 1 may indicate that layer 1 includes tile-layer items 8-12; and item 2 may that indicate layer 2 includes items 13-17.

In an aspect, coded tile-layer items may have a corresponding type assigned for them, such as an independent-type tile-layer item ("Indep" in FIG. 2B) or a derived-type tile-layer item ("Derived"). Further, derived-type tile-layer items may have a corresponding derivation variant assigned to them, such as a predicted-variant ("Pred" in FIG. 2B), a layer-selector-variant, or an identity-variant ("Iden" in FIG. 2B). An independent-type tile-layer identification, such as "Indep" shown for item 3, may indicate that the item 3 may be encoded or decoded independently of any other tile-layer item in an encoded bitstream. Alternately, decoding of a tile-layer unit with a derived-type identification may be performed with reference to another tile-layer unit. Exemplary dependencies among items are indicated by dotted-line arrows in FIG. 2B. For example, a derived-type item identified as a predicted-variant, such as exemplary item 8, may indicate that prediction of pixel values for item 8 at quality level 1 occurs from pixels values of item 3 at quality level 0. A derived-type item with a predicted-variant may additionally include refinement data contained in the item (item 8) for increasing quality of a prediction made from a lower quality level to a higher quality level.

A derived-type item identified with an identity-variant (such as exemplary item 12) may be decoded by adopting decoded data from the tile 7 from which it depends. Tiles identified in this manner may not include refinement data, and hence an identity variant tile-layer item may have an identical coding quality level as the tile-layer item 7 from which it is predicted.

In an aspect, a packager may concatenate the packaging units, such as log and tile-layer items 0 to 17, for example, in sequential order according to their item number (e.g., an encoded bitstream may first include item 0, followed by item 1, item 2, . . . , with item 17 included last). An encoded bitstream may include data indicating the structure or relationships between the various packaging units in the bitstream.

Figure 4:
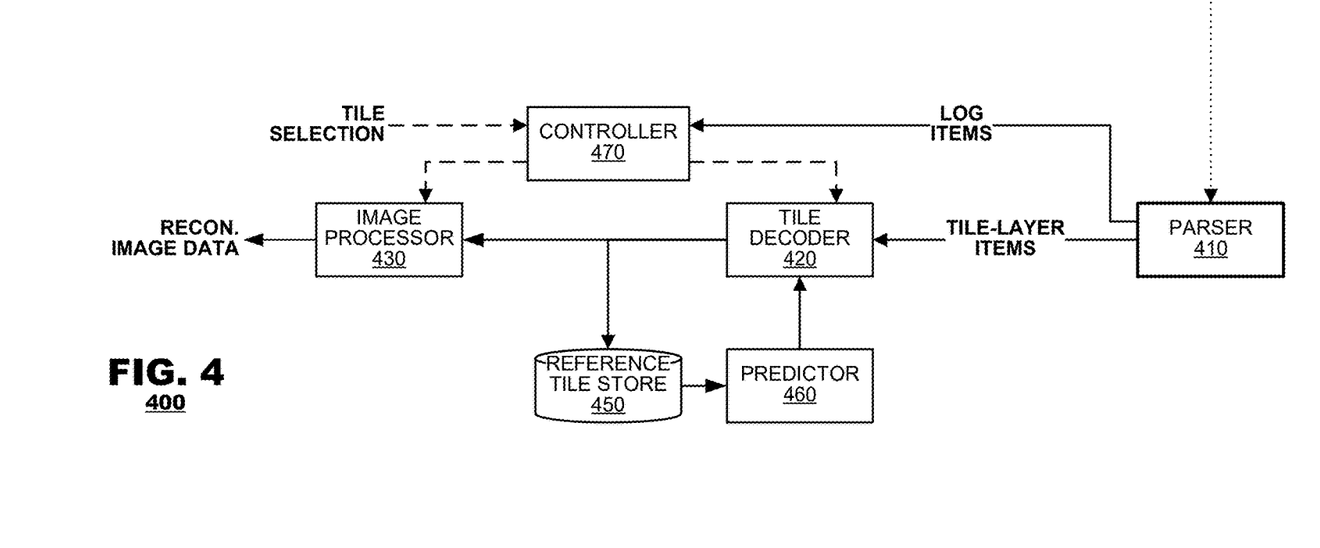
FIG. 4 is a block diagram of a decoding system according to aspects of this disclosure.

In other aspects, tile-layer items may also include one or more decoder properties (not depicted in FIG. 2B. A decoder property may specify parameters to be used while decoding the respective tile-layer item. Such a decoder property may be a transformative operation to be applied to the decoded output from a tile-layer item, or a decoder property may be a control parameter for operation of the decoder operating according to an underlying coding protocol. For example, independent-type or derived-type tile-layer items may include properties specifying transformative operations such as: a clean aperture property (e.g., a "clap" property) indicating the decoded output of the item should be cropped; a rotation property (e.g., an "irot" property) indicating the decoded output should be rotated; a scaling property (e.g. an "iscl" property) indicating the decoded output should be spatially scaled up or down; and a mirroring property (e.g. an "imir" property. Transformative operations may be combined on a single tile-layer item and may be performed, for example, by image processor 430 at the output of tile decoder 420. An example decoder property specifying a decoder control may be a layer selector property (e.g., an "lsel" property) specifying which layer should be selected by a tile decoder for decoding and reconstruction from a tile-layer data stream conforming to an underlying layered encoding protocol. Decoder control may be performed, for example, by tile decoder 420.

Figure 3:
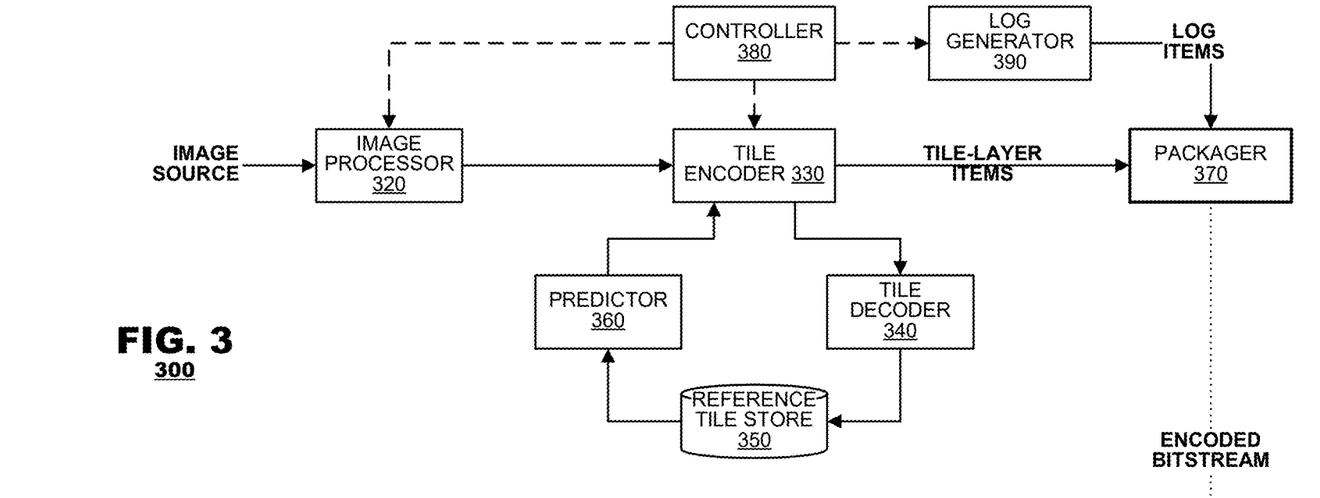
FIG. 3 is a block diagram of an encoding system according to aspects of this disclosure.

FIG. 3 is a block diagram of an encoding system 300 according to aspects of this disclosure. The system 300 may include an image source, an image processor 320, a tile encoder 330, a tile decoder 340, a reference tile store 350, a predictor 360, and a packager 370, controller 380, and log generator 390. The image source may generate an image spanning multiple tiles. The image processor 320 may perform image processing operations to condition the image for coding. In one aspect, the image processing system 320 may generate different versions of source data to facilitate encoding the source data into multiple layers of coded data. In an aspect, image processing system 320 may generate different resolutions of a source image such as a high layer with a higher spatial resolution and a lower layer with a lower spatial resolution. The tile encoder 330 may generate coded tile-layer data for different tiles and different layers of coding quality, typically by exploiting spatial and/or temporal redundancies in the image data. For example, tiler encoder 330 may further partition tiles of the source image into smaller rectangularly-shaped pixel blocks, and may include various coding tools such as a frequency domain transform (e.g., a discrete cosine transform (DCT)), quantization, and prediction from prior coded image data (including prediction from prior tile-layers), and entropy encoding. The tile encoder 330 may output a coded representation of the corresponding source data that consumes less bandwidth than the original source image when transmitted and/or stored. Tile encoder 330 may output data in discrete packaging units, and in some aspects, independent-type tile-layer package units may be decoded independently of other tile-layer packaging units, while derived-type tile-layer packaging units may depend on references to other tile-layer packaging units. Tile encoder 330 may also output data in discrete layers, and in some aspects, separate layers may be packaged and stored or transmitted independently of other layers.

The tile decoder 340 may invert coding operations performed by the tile encoder 330 to obtain a reconstructed tile from the coded video data. Typically, the coding processes applied by the tile encoder 330 are lossy processes, which cause the reconstructed tile to possess various differences when compared to the original tile. The tile decoder 340 may reconstruct tiles of select encoded tiles, which are designated as "reference tiles," and store the decoded reference tiles in the reference tile store 350. In the absence of transmission errors, the decoded reference tiles may replicate decoded reference tiles obtained by a decoder (such as decoding system 400 of FIG. 4).

The predictor 360 may select prediction references for new input tiles as they are coded. For each portion of the input tile being coded (called a "pixel block" for convenience), the predictor 360 may select a coding mode and identify a portion of a reference tile that may serve as a prediction reference search for the pixel block being coded. The coding mode may be an intra-coding mode, in which case the prediction reference may be drawn from a previously-coded (and decoded) portion of the tile being coded. Alternatively, the coding mode may be an inter-coding mode, in which case the prediction reference may be drawn from one or more previously-coded and decoded tiles, commonly associated with a different time instance or access unit than that of the current tile. In one aspect of layered coding, prediction references may be pixel blocks previously decoded from another layer, typically a lower layer, lower than the layer currently being encoded. In an aspect, prediction of a tile-layer from a differentially coded enhancement layer may have restrictions on the available prediction references, for example to enable partial decoding of an encoded image. For example, predictor 360 may restrict prediction references for a current tile to prior coded tile-layers units of the same corresponding tile at a lower layer.

When an appropriate prediction reference is identified, the predictor 360 may furnish the prediction data to the tile encoder 330. The tile encoder 330 may code input video data differentially with respect to prediction data furnished by the predictor 360. Typically, prediction operations and the differential coding operate on a pixel block-by-pixel block basis. Prediction residuals, which represent pixel-wise differences between the input pixel blocks and the prediction pixel blocks, may be subject to further coding operations to reduce bandwidth further. In an aspect for prediction-variant tile-layers, encoded prediction residuals may act as encoded refinement data for increasing a quality level above the quality level of a reference tile, while identity-variant tile-layers may not include encoded residual or other refinement data and may not increase the quality level from the level of the reference tile.

In an aspect, controller may control the encoding process, including selection of tile partitioning by image processor 320, selection of coding quality of the tile-layers encoded by tile encoder 330. In another aspect, log generator may generate a log of the encode tiles and layers, and the log may be based on the encoding selections provided by controller 380. Packager 370 may integrate the coded tile-layer items and log items into an encoded bitstream. For example, packager 370 may serialize the log items prior to the tile-layer item, and then serialize all tile-layer items from a lower layer prior to serializing tile-layer items from a higher layer (such as is depicted by the number of items 0 to 17 in FIG. 2B). In other examples, log items or the data in log items may be integrated in other ways into a bitstream of tile-layer items such as encapsulating log data as metadata according to a coding protocol (such as in supplemental enhancement information (SEI) messages of HEVC). In an aspect, log items generated by log generator 390 may provide pointers to various points within the encoded bitstream where parsing may start or continue without parsing the entire prior bitstream. Within a layer, packager 370 may serialize tile-layer items according to a spatial ordering, such as a raster scan ordering of tiles, or according to other orderings such as the spiral ordering depicted in FIG. 7.

FIG. 4 is a block diagram of a decoding system 400 according to aspects of this disclosure. The decoding system 400 may include a parser 410, a tile decoder 420, an image processor 430, a reference tile store 450, a predictor 460, and a controller 470. The parser 410 may receive coded video data, for example from an encoder such as encoder 300 (FIG. 3) via a communications channel or storage device. The received coded video data may be organized into packaging items, which may have been serialized into an encoded bitstream.

Parser 410 may parse the received coded video data in discrete packaging units including log items and tile-layer items. Log items may be passed to controller 470, which may use information in the log to select which tile-layer items are decoded by tile decoder 420 and which tiles are processed by image processor 430. Such control over decoder 400 may be based on a tile selection control provided to controller 470, and the tile selection control may be based, for example, on a desired viewport within the encoded image that is desired to be displayed.

Parser 410 may pass tile-layer items to tile decoder 420. The tile decoder 420 may decode the coded video data within the tile-layer units selected by controller 470. Derived-type tile-layer units may be decoded with reference to prediction data supplied by the predictor 460. For example, prediction data may be generated according to motion-compensated video coding tools, where prior tile-layers (corresponding to different tiles and/or different layers) may be treated as prior video frames. The tile decoder 420 may output decoded video data to image processor 430, which may composite multiple tiles from layer and output reconstructed image data. The image processor 430 may composite decoded tile data from the tile decoder 420 according to the spatial arrangement of the tiles when they were partitioned at an encoder, and compositing may include blending of spatially overlapped tiles, such as tile 210 of FIG. 2A. In an aspect for progressive decoding, an image processor may output a series of distinct reconstructed image data for a single encoded image, each output corresponding to a different quality layer.

In other aspects, tile-layer items may also include a decoder property specifying property to be used while decoding the tile-layer item. Such a decoder property may be a transformative operation to be applied to the decoded output from a tile-layer unit, or a decoder property may be a control parameter for operation of the decoder operating according to an underlying coding protocol. For example, independent-type or derived-type items may include properties specifying a transformative operations such as: a clean aperture property (e.g., a "clap" property) indicating the decoded output of the item should be cropped; a rotation property (e.g., an "irot" property) indicating the decoded output should be rotated; a scaling property (e.g. an "iscl" property) indicating the decoded output should be spatially scaled up or down; and a mirroring property (e.g. an "imir" property. Transformative operations may be performed, for example, by image processor 430. An example decoder property specifying a decoder control may be a layer selector property (e.g., an "lsel" property) specifying which layer, from a stream conforming to an underlying layered encoding protocol, should be selected for decoding and reconstruction by a decoder. Decoder control may be performed, for example, by tile decoder 420.

Figure 5:
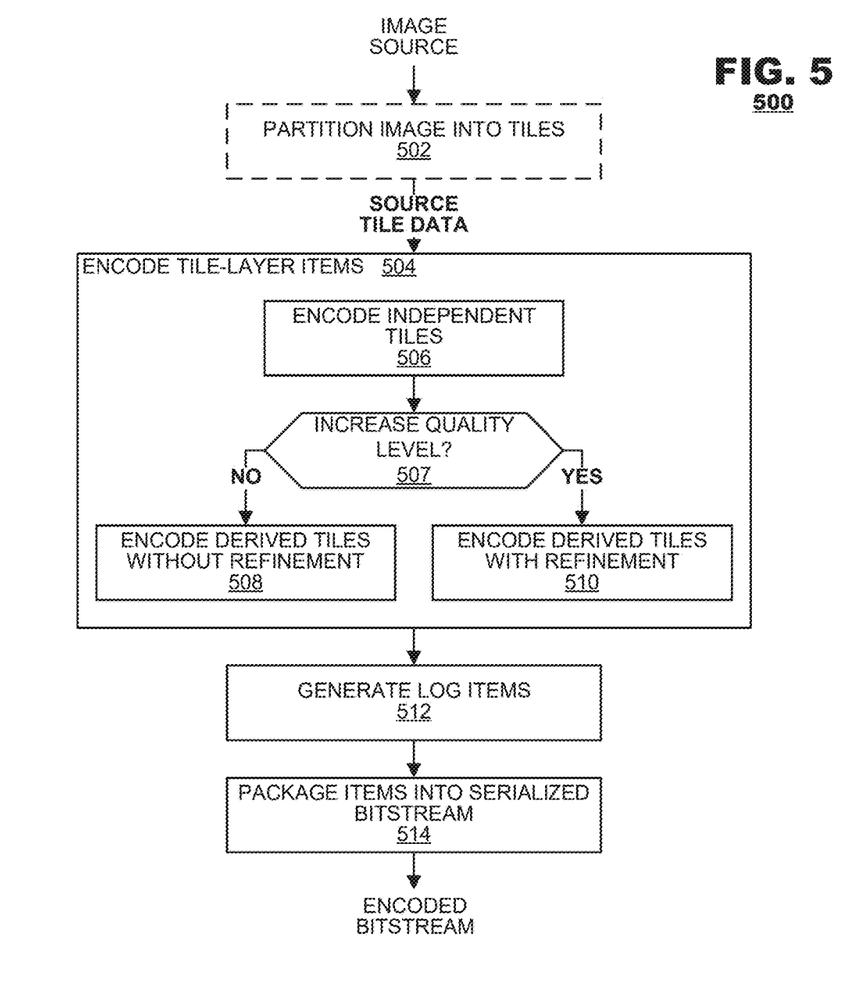
FIG. 5 illustrates a method for encoding according to aspects of this disclosure.

FIG. 5 illustrates a method 500 for encoding according to aspects of this disclosure. Method 500 includes encoding image data from an image source into tile-layer items (box 504), generating log items (box 512) containing a log of encoded tile-layers, and packaging the tile-layer items and log items into an encoded bitstream (box 512). Encoding tile-layer items may include encoding independent tiles (box 506), and then, when a quality level for a tile does not increase (box 507), encoding derived-type tiles of an identity variant without refinement of image data (box 508). When a quality level for a tile does increase (box 507), encoding derived tiles of other variant(s) with refinement (box 510). In an optional aspect, an image from the image source may be spatially partitioned into distinct tiles of source data (box 502), for example according to an arrangement of spatial tiles for a source image.

In an aspect, image data may be encoded (as in box 504) in distinct layers corresponding to coding quality levels, and the generated log items (box 512) may enumerate the layers. For example, the quality levels may be enumerated in a progressive group of log items, as in FIG. 2B. In an aspect, the distinct coded layers may correspond to different types of variation in coding quality. In a first example, coding quality levels may correspond to changing spatial resolution of a coded image or image tiles, where lower quality levels indicate a lower resolution as compared to high quality levels indicating a higher resolution. In a second example, coding quality levels may correspond to changing precision in pixel representation, such as a change in bit depth of pixel values, where lower quality levels may indicate less precise pixel representations (e.g., fewer bits per pixel) as compared to higher quality levels that may indicate more precise pixel representations (e.g., more bits per pixel). In a third example, coding quality levels may indicate a degree of quantization used for lossy coding of image data, where lower quality levels may indicate a high quantization scale parameter that causes a quantizer to throw away large amounts of image information as compared to higher quality levels that may indicate a lower quantization scale parameter that causes the quantizer to throw away comparatively smaller amounts of image information. In an aspect, image processor 320 (FIG. 3), in addition to partitioning an image into source tile data, may also produce a plurality of versions of source image data for each tile, where different versions of a tile correspond to the different distinct coding quality levels. In an aspect, an ordering packaging items in a bitstream (box 514) may include providing log items prior to providing tile-layer items.

In an aspect, tile-layers may be encoded (box 504) as either an independent-type or derived-type. Tile-layers encoded as independent-type may be encoded and decoded independently without reference to any other encoded tile-layers. Alternately, tile-layers encoded as derived-type may require reference to a prior tile-layer. For example, an identity-variant derived-type may copy pixel data of a prior tile-layer (without refinement) to produce a current tile-layer at a quality level that is the same as the prior tile-layer, while a prediction-variant derived-type may predict pixel data if a current tile-layer from a prior tile-layer and also include refinement data for refining the prediction and increasing the quality level of the current tile-layer above the quality level of the prior tile layer. As used herein, a "prior" and "current" tile-layer may refer to an ordering of tile-layer items in a serialized bitstream, and/or may refer to an encoding or decoding order for processing an encoded bitstream.

Figure 6:
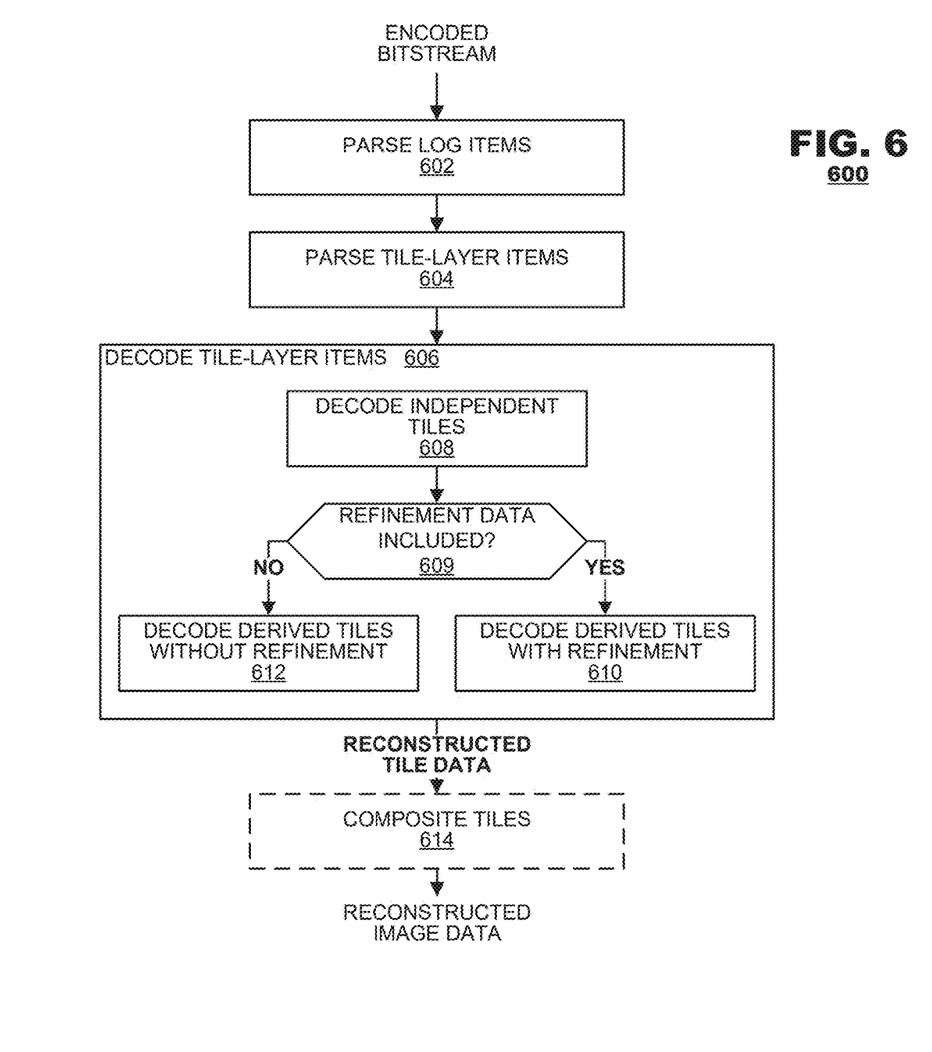
FIG. 6 illustrates a method for decoding according to aspects of this disclosure.

FIG. 6 illustrates a method 600 for decoding according to aspects of this disclosure. Method 600 includes parsing log items from an encoded bitstream (box 602), parsing tile-layer items from the encoded bitstream (box 604), decoding tile-layer items (box 606), to produce reconstructed image data. In an optional aspect, the distinct tiles of reconstructed image data may be composited (box 614), for example according to an arrangement of spatial tiles used for partitioning an image into tiles at an encoder of the encoded bitstream.

In an aspect, parsing of tile-layer items from the encoded bitstream (box 604) may be based on the log contained in the parsed log items. For example, the log may enumerate tile-layer items in the encoded bitstream, group the tile layer items into layer of encoded quality, and may also identify a location of each tile-layer item within the encoded bitstream (such as providing an address of the beginning of each tile-layer item). In an aspect, the log may comprise a series of packaging items identified as a progressive group, and each of the packaging items in the progressive group series may identify the tile-layer items for one coding quality layer. For example, see the tile-layer enumeration in the progressive group 252 of log items in FIG. 2B. In another aspect, the tile layer items may comprise a series of tile groups, each tile group corresponding to one coding quality layer, and each tile group including a series of tile-layer units of coded data for the tiles at the corresponding coding quality. For example, see the tile groups 254, 256, 258 in FIG. 2B. In the example of FIG. 2B, log data from a progressive group of log items may be used to identify which tile-layer items should be parsed from the encoded bitstream and/or decoded by a tile-layer decoder.

In an aspect, the optional compositing of tiles (box 614), may spatially concatenate reconstructed tile data from different tiles according to a partitioning used to divide a source frame into tiles at an encoder. In another aspect, when a tile spatially overlaps with other tiles (such as tile 210 of FIG. 2), the overlapping tiles may be blended together, such as by blending overlapping pixels in regions where tiles overlap. Blending may be performed based on equal weighting, could be based to the distance of the samples from the boundaries of each overlapping tile, could consider the coded quality of the tiles (e.g., higher quality tile receives a larger weight), and/or could use explicit weighting parameters that may be indicated in the log or through other means. In another embodiment, samples from different overlapping tiles may be combined by alternating between the different tiles based on position (e.g., in a raster scan manner), alternating the weighting parameters based on position, or by using a pseudonumber generator to determine the weights or the tile to be used for a sample. The pseudonumber generator could be initialized by a predefined or signaled seed value that is associated with the tiles (e.g., present in the log).

Figure 7:
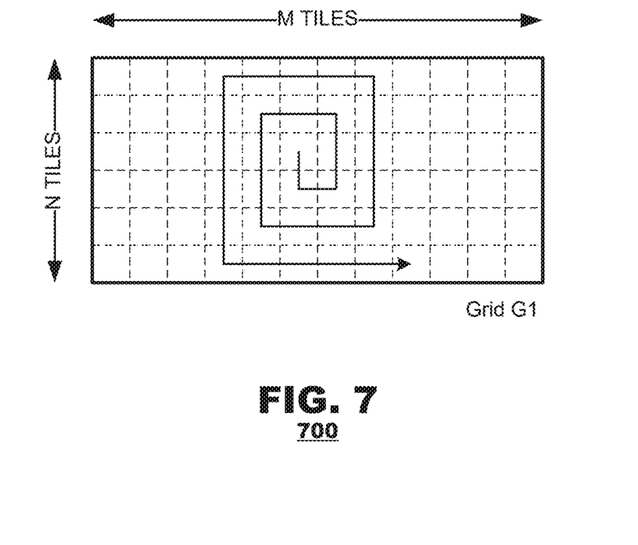
FIG. 7 illustrates example spiral path through tile partitions of a frame.

FIG. 7 illustrates example 700 of a spiral path through tile partitions of an image frame. A spiral path may be centered on a region of interest in the frame, and the path may be used to enumerate an ordering of tiles within an image frame. The tile ordering may be used, for example, as the packaging order of the tile-layer items within an encoded bitstream. In the example of FIG. 2B, the tiles within each tile group may be ordered in an encoded bitstream based on a path such as the spiral path depicted in FIG. 7. For example, items 3-7 may be ordered based on their corresponding tile location and a selected path through the tiles of an image.

In another aspect, a path through tiles of an image, such as the spiral path in FIG. 7, may be used for ordering of decoding in a decoder, regardless of ordering within a bitstream. For example, controller 470 (FIG. 4) may control decoder 400 to decode tile-layer items according to a spiral path centered around a region of interest from an encoded bitstream, even when the encoded bitstream was serialized with a raster-scan ordering of tiles.

The spiral path of FIG. 7 is merely exemplary, and other paths through tile locations may be used. For example, a tile path for packaging order and/or decoding order may start from a region (or tile) or interest, and may proceed to other neighboring tiles in any predetermined order or an order specified in the encoded bitstream.

The foregoing discussion has described operations of aspects of the present disclosure in the context of image encoders and decoder, including encoder 120 and decoder 130. Commonly, these components are provided as electronic devices. Imaging systems and network channels can be embodied in integrated circuits, such as application specific integrated circuits, field programmable gate arrays, and/or digital signal processors. Alternatively, they can be embodied in computer programs that execute on camera devices, personal computers, notebook computers, tablet computers, smartphones, or computer servers. Such computer programs typically include instructions stored in non-transitory physical storage media such as electronic-based, magnetic-based storage devices, and/or optically-based storage devices, where they are read into a processor and executed. Decoders are commonly packaged in consumer electronic devices, such as smartphones, tablet computers, gaming systems, DVD players, portable media players, and the like. They can also be packaged in consumer software applications such as video games, media players, media editors, and the like. And, of course, these components may be provided as hybrid systems with distributed functionality across dedicated hardware components and programmed general-purpose processors, as desired.

Imaging systems of devices, including encoders and decoders, may exchange video through channels in a variety of ways. They may communicate with each other via communication and/or computer networks as illustrated in FIG. 1. In still other applications, video systems may output video data to storage devices, such as electrical, magnetic and/or optical storage media, which may be provided to decoders sometime later. In such applications, the decoders may retrieve the coded video data from the storage devices and decode it.

Several embodiments of the invention are specifically illustrated and/or described herein. However, it will be appreciated that modifications and variations of the invention are covered by the above teachings and within the purview of the appended claims without departing from the spirit and intended scope of the invention.

We claim:

1. A method of still image encoding, comprising:
   generating a log identifying coding quality levels applied to the still image, the log including a plurality of first items each first item corresponding to a quality level in the log, each first item containing reference(s) to second item(s) corresponding to the respective quality level;
   for each of a plurality of spatial tiles of the still image, generating a plurality of second items each corresponding to a quality level identified in the log, wherein each of the second items has a respective item type from the set of an independent type, a derived type with an increased quality level, and a derived type without an increased quality level, when one of the second items has the independent type, encoding a corresponding tile at a quality level of the one of the second items without reference to others of the generated second items;

when one of the second items has the derived type with the increased quality level, encoding a corresponding tile with refinement data at the one second item's respective quality level at least in part by reference to another of the generated second items corresponding to its respective tile; and when one of the second items has the derived type without the increased quality level, encoding a corresponding tile, at least in part by reference to another of the generated second items corresponding to the same corresponding tile, and without refinement data at a second, lower coding quality level of a reference tile of the second item.

2. The method of claim 1, further comprising packaging the first items and second items into an encoded stream, and transmitting the encoded stream to a communications channel.

3. The method of claim 1, wherein at least one second item with the derived type indicates its reference to the other of the generated second items with a motion-compensation video coding tool.

4. The method of claim 1, wherein at least one second item with the derived type indicates selection of a layer corresponding to one of a plurality of coding quality levels from a multi-layer video coding tool.

5. The method of claim 1, wherein generated second items are grouped into tile sets, and an ordering of the tiles in a tile set starts with a tile corresponding to a region of interest, and follows with tiles following a path away from the region of interest.

6. The method of claim 1, wherein an identity variant of at least one second item with the derived type without an increased quality level of indicates the corresponding referenced second item is copied without increasing the quality level of pixel data.

7. The method of claim 1, wherein
the log indicates a spatial pixel resolution of the image described by one of the second items, and
at least one second item with derived type with an increased quality level includes image refinement data for increasing a spatial pixel resolution of the one second item indicated by the log.

8. The method of claim 1, wherein
the log indicates a bit depth of pixel data represented in one of the second items, and
at least one second item with derived type with an increased quality level includes image refinement data for increasing a bit depth of the one second item indicated by the log.

9. The method of claim 1, wherein the generated second items are grouped into tile sets, and at least one second item in a tile set corresponds to a spatial tile that is spatially overlapped with other tiles in the tile set.

10. The method of claim 1, wherein one of the second items includes a decoder property for scaling specifying the decoded output of the one second item is to be spatially scaled after decoding.

11. The method of claim 1, wherein:
at least one second item with the independent type includes coded image data for its corresponding spatial tile without reference to other second items;
at least one second item of the derived type without an increased quality level is an identity variant that does not include pixel refinement data for increasing the quality level of another second item referenced by the second item with identity variant; and
at least one second item of the derived type with an increased quality level includes pixel refinement data for increasing the quality level of another second item reference by the one second item with the derived type with an increased quality level.

12. The method of claim 1, wherein the generated second items corresponding to a common level identified in the log are grouped into tile sets, and each tile set having a number of second items corresponding to a of the tiles.

13. A method of still image decoding, comprising:
parsing, from an encoded stream, a log of coding quality levels applied to the still image, the log identifying, in a plurality of first items in the log, quality levels of still image encodings in the stream and references to second items at each quality level;
for a plurality of spatial tiles of the still image, parsing, from the encoded stream, selected item(s) from the encoded stream, the encoded stream containing a plurality of available second items, each of the available second items corresponding to one of the quality levels identified in the log, and each available second item having an item type from the set of an independent type and a derived type;
when one of the selected second items has the independent type, decoding the selected second item at the one selected second item's respective quality without reference to others of the available second items to produce a reconstrued tile at the respective quality level;
when one of the selected second items has the derived type and includes refinement data, decoding the one selected second item at least in part by reference to at least one other second item to produce a reconstructed tile at the selected second item's respective quality level; and
when one of the selected second items has a derived type and does not include refinement data, decoding the one selected second item at least in part by reference to at least one other second items to produce a reconstructed tile at the selected second item's respective quality level.

14. The method of claim 13, further comprising receiving the log and the parsed second items from a communications channel.

15. The method of claim 13, wherein at least one available second item with the derived type indicates prediction of a corresponding tile from the corresponding referenced second item with a motion-compensation video coding tool.

16. The method of claim 13, wherein at least one available second item with the derived type indicates selection of a layer corresponding one of the coding quality levels from a multi-layer video coding tool.

17. The method of claim 13, wherein parsed second items are grouped into tile sets, and an ordering of the tiles in a tile set starts with a tile corresponding to a region of interest, and follows with tiles following a spiral path away from the region of interest.

18. The method of claim 13, wherein an identity variant of at least one available second item of derived type indicates that another second item referenced by the one available second item is to be copied without increasing the quality level of pixel data.

19. The method of claim 13, wherein
the log indicates a spatial pixel resolution of at least one coding quality level the image described by one of the available second items, and
at least one second item with derived type includes image refinement data for increasing a spatial pixel resolution of the one second item indicated by the log.

20. A non-transitory computer readable medium storing instructions of still image decoding that, when executed by a processor, cause the processor to:
parse, from an encoded stream, a log of coding quality levels applied to the still image, the log identifying, in a plurality of first items in the log, quality levels of still image encodings in the stream and references to second items at each quality level;
for a plurality of spatial tiles of the still image, parse, from the encoded stream, a selected second item(s) from the encoded stream, the encoded stream containing a plurality of available second items, each of the available second items corresponding to one of the quality levels identified in the log, and each available second item having an item type from the set of an independent type and a derived type;
when one of the selected second items has the independent type, decode the selected second item at the one selected second item's quality without reference to others of the available second items to produce a reconstrued tile at the respective quality level;
when one of the selected second items has the derived type and includes refinement data, decode the one selected second item at least in part by reference to at least one other second item to produce a reconstructed tile at the selected second item's respective quality level;
when one of the selected second items has the derived type and does not include refinement data, decode the one selected second item at least in part by reference to at least one other second items to produce a reconstructed tile at the selected second item's respective quality level.

* * * * *